United States Patent
Liao et al.

(10) Patent No.: US 12,307,161 B1
(45) Date of Patent: May 20, 2025

(54) AUDIO PARAMETER ADJUSTING METHOD, APPARATUS AND DEVICE, AND STORAGE MEDIUM

(71) Applicant: Linkplay Technology Inc., Newark, CA (US)

(72) Inventors: Dongsheng Liao, Newark, CA (US); Pu Yang, Newark, CA (US); Lifeng Zhao, Newark, CA (US); Ning Liu, Newark, CA (US)

(73) Assignee: Linkplay Technology Inc., Newark, CA (US)

( * ) Notice: Subject to any disclaimer, the term of this patent is extended or adjusted under 35 U.S.C. 154(b) by 0 days.

(21) Appl. No.: 19/023,367

(22) Filed: Jan. 16, 2025

(30) Foreign Application Priority Data

Mar. 21, 2024 (CN) .......................... 202410328190.3

(51) Int. Cl.
 *G06F 3/16* (2006.01)
(52) U.S. Cl.
 CPC .............. *G06F 3/165* (2013.01); *G06F 3/162* (2013.01)
(58) Field of Classification Search
 CPC ................................. G06F 3/165; G06F 3/162
 See application file for complete search history.

(56) References Cited

U.S. PATENT DOCUMENTS

| | | | | |
|---|---|---|---|---|
| 10,111,002 | B1 * | 10/2018 | Poulad | H04H 60/04 |
| 2010/0290643 | A1 * | 11/2010 | Mihelich | H04S 7/301 |
| | | | | 381/103 |
| 2014/0328505 | A1 * | 11/2014 | Heinemann | G06F 3/012 |
| | | | | 381/303 |
| 2015/0223002 | A1 * | 8/2015 | Mehta | H04S 7/30 |
| | | | | 381/303 |
| 2023/0199422 | A1 | 6/2023 | Chou | |

FOREIGN PATENT DOCUMENTS

| | | |
|---|---|---|
| CN | 112740169 A | 4/2021 |
| CN | 117130576 A | 11/2023 |
| CN | 117479076 A | 1/2024 |
| CN | 117519632 A | 2/2024 |

OTHER PUBLICATIONS

First Office Action issued in counterpart Chinese Patent Application No. 202410328190.3, dated Sep. 6, 2024.
Notification to Grant Patent Right for Invention issued in counterpart Chinese Patent Application No. 202410328190.3, dated Nov. 6, 2024.

* cited by examiner

*Primary Examiner* — Joseph Saunders, Jr.
(74) *Attorney, Agent, or Firm* — Westbridge IP LLC

(57) ABSTRACT

Disclosed are an audio parameter adjustment method, an audio parameter adjustment apparatus, an audio parameter adjustment device and a storage medium. The method includes: obtaining a target audio effect of an audio system, and analyzing the target audio effect to obtain a corresponding audio metric parameter; determining a target environment where the audio system is currently located, and calculating an environmental optimization parameter of the target environment; calculating, based on the audio metric parameter and the environmental optimization parameter, an optimization parameter of the audio system; and performing adaptive adjustment on the audio system based on the optimization parameter of the audio system.

9 Claims, 4 Drawing Sheets

AUDIO PARAMETER ADJUSTING METHOD, APPARATUS AND DEVICE, AND STORAGE MEDIUM

CROSS-REFERENCE TO RELATED APPLICATIONS

This application claims priority to Chinese Patent Application No. 202410328190.3, filed on Mar. 21, 2024, which is incorporated by reference herein in its entirety.

TECHNICAL FIELD

The present disclosure relates to the field of intelligent audio terminal control technologies, in particular to an audio parameter adjustment method, an audio parameter adjustment apparatus, an audio parameter adjustment device and a storage medium.

BACKGROUND

With the development of audio processing technologies, various smart products in an audio system may process audio by changing parameters to produce a variety of audio effects. For example, when a terminal plays original audio, it may set the playback parameters of the terminal based on a desired audio effect. Different audio effects correspond to different audio parameters, resulting in the audio effect corresponding to the audio parameter on the basis of the original audio. However, each smart product in the audio system can only process audio according to fixed audio parameters, and the audio parameters in these smart products must be preset. The preset audio parameters of existing smart speaker products cannot be intelligently adjusted based on the layout and size of different environments, making it impossible to achieve personalized audio effect optimization for different environmental scenarios. Moreover, most speaker products in the prior art use fixed and reasonable tuning parameters, allowing them to achieve relatively good sound quality in small enclosed spaces. However, in an open space with a relatively large area or a special structure, the sound quality is likely to deteriorate due to that it is unable to perform intelligently adjustment for different spatial acoustic characteristics.

SUMMARY

In a first aspect, the present disclosure provides an audio parameter adjustment method, including: obtaining a target audio effect of an audio system, and analyzing the target audio effect to obtain a corresponding audio metric parameter; determining a target environment where the audio system is currently located, and calculating an environmental optimization parameter of the target environment; calculating, based on the audio metric parameter and the environmental optimization parameter, an optimization parameter of the audio system; and performing adaptive adjustment on the audio system based on the optimization parameter of the audio system.

Optionally, in a first implementation of the first aspect of the present disclosure, obtaining the target audio effect of the audio system, and analyzing the target audio effect to obtain the corresponding audio metric parameter includes: obtaining the target audio effect of the audio system based on performance metrics of the audio system, analyzing the target audio effect to determine the equalizer setting of the audio system corresponding to the target audio effect; obtaining, based on the equalizer setting, the audio metric parameter of the audio system under the target audio effect.

Optionally, in a second implementation of the first aspect of the present disclosure, analyzing the target audio effect to determine the equalizer setting of the audio system corresponding to the target audio effect includes: performing spectral analysis on the target audio effect to obtain an audio distribution under the target audio effect; obtaining an equalizer type of the audio system, and determining, based on the equalizer type and the audio distribution, the equalizer setting of the audio system corresponding to the target audio effect.

Optionally, in a third implementation of the first aspect of the present disclosure, determining the target environment where the audio system is currently located, and calculating the environmental optimization parameter of the target environment includes: determining spatial layout of the target environment where the audio system is currently located; and performing, based on the spatial layout, acoustic characteristic data sampling on the target environment to obtain the environmental optimization parameter of the target environment.

Optionally, in a fourth implementation of the first aspect of the present disclosure, determining the spatial layout of the target environment where the audio system is currently located, and performing acoustic characteristic data sampling on the target environment based on the spatial layout to obtain the environmental optimization parameter of the target environment includes: obtaining the spatial layout of the target environment and determining arrangement positions of audio testing devices based on the spatial layout; performing audio tests on the target environment using full-spectrum audio signals and obtaining test data of each arrangement position to obtain the acoustic characteristic data of the target environment; generating a frequency response curve of the target environment based on the acoustic characteristic data, and obtaining the environmental optimization parameter of the target environment based on the frequency response curve.

Optionally, in a fifth implementation of the first aspect of the present disclosure, determining the spatial layout of the target environment where the audio system is currently located, and performing acoustic characteristic data sampling on the target environment based on the spatial layout to obtain the environmental optimization parameter of the target environment includes: obtaining the spatial layout of the target environment and determining arrangement positions of audio testing devices based on the spatial layout; performing audio tests on the target environment using full-spectrum audio signals and obtaining test data of each arrangement position to obtain the acoustic characteristic data of the target environment; establishing an acoustic transfer model of the target environment based on the acoustic characteristic data, performing iterative adjustments on the audio parameter of the audio system, and obtaining, based on a comparison result between an audio effect corresponding to each of iteratively adjusted audio parameters and the target audio effect, the environmental optimization parameter of the target environment.

Optionally, in a sixth implementation of the first aspect of the present disclosure, establishing the acoustic transfer model of the target environment based on the acoustic characteristic data includes: obtaining audio data of full-spectrum audio signals for audio testing and extracting the test data of each arrangement position from the acoustic characteristic data; and performing, based on the audio data and the test data, machine learning to establish the acoustic transfer model of the target environment.

Optionally, in a seventh implementation of the first aspect of the present disclosure, performing iterative adjustments on the audio parameter of the audio system, and obtaining, based on the comparison result between the audio effect corresponding to each of iteratively adjusted audio parameters and the target audio effect, the environmental optimization parameter of the target environment includes: performing iterative adjustments on the audio parameter of the audio system based on an optimization algorithm, and performing audio tests based on the iteratively adjusted audio parameters and the acoustic transfer model to obtain audio effects corresponding to the audio parameters respectively; selecting an audio effect that matches the target audio effect from the audio effects to obtain an effective audio effect, and obtaining the environmental optimization parameter of the target environment based on an audio parameter corresponding to the effective audio effect.

Optionally, in an eighth implementation of the first aspect of the present disclosure, calculating, based on the audio metric parameter and the environmental optimization parameter, the optimization parameter of the audio system includes: performing numerical splitting on the environmental optimization parameter to identify an optimization parameter item and a corresponding optimization parameter value; optimizing, based on the optimization parameter item and the corresponding optimization parameter value, the audio metric parameter to calculate the optimization parameter of the audio system.

Optionally, in a ninth implementation of the first aspect of the present disclosure, performing adaptive adjustment on the audio system based on the optimization parameter of the audio system includes: generating adjustment control instructions based on the optimization parameter, and sending the adjustment control instructions to the audio system to perform equalizer setting on the audio system and adjust an audio parameter of the audio system.

Optionally, in a tenth implementation of the first aspect of the present disclosure, generating the adjustment control instructions based on the optimization parameter, and sending the adjustment control instructions to the audio system to perform equalizer setting on the audio system and adjust the audio parameter of the audio system includes: obtaining an interface format of the audio system and performing format conversion on the optimization parameter based on the interface format, and generating the adjustment control instructions of the audio system; sending the adjustment control instructions to the equalizer of the audio system and perform equalizer setting on the audio system by adjusting a value of the equalizer to adjust the audio parameter of the audio system.

Optionally, in an eleventh implementation of the first aspect of the present disclosure, the method further includes: subsequent to performing adaptive adjustment on the audio system based on the optimization parameter of the audio system, generating a correspondence between a preset acoustic transfer model and the audio metric parameter, and creating a model audio configuration database.

In a second aspect, the present disclosure provides an audio parameter adjustment apparatus, including: an analyzing module, configured to obtain a target audio effect of an audio system, and analyze the target audio effect to obtain a corresponding audio metric parameter; a first calculating module, configured to determine a target environment where the audio system is currently located, and calculate an environmental optimization parameter of the target environment; a second calculating module, configured to calculate, based on the audio metric parameter and the environmental optimization parameter, an optimization parameter of the audio system; and an adjustment module, configured to perform adaptive adjustment on the audio system based on the optimization parameter of the audio system.

Optionally, in a second implementation of the second aspect of the present disclosure, the analyzing module includes: an obtaining unit, configured to obtain the target audio effect of the audio system based on performance metrics of the audio system; a determining unit, configured to analyze the target audio effect to determine the equalizer setting of the audio system corresponding to the target audio effect, and obtain, based on the equalizer setting, the audio metric parameter of the audio system under the target audio effect.

Optionally, in a second implementation of the second aspect of the present disclosure, the determining unit is further configured to: perform spectral analysis on the target audio effect to obtain an audio distribution under the target audio effect; obtain an equalizer type of the audio system, and determine, based on the equalizer type and the audio distribution, the equalizer setting of the audio system corresponding to the target audio effect.

Optionally, in a third implementation of the second aspect of the present disclosure, the first calculating module includes: a sampling unit, configured to: determine spatial layout of the target environment where the audio system is currently located; and perform, based on the spatial layout, acoustic characteristic data sampling on the target environment to obtain the environmental optimization parameter of the target environment.

Optionally, in a fourth implementation of the second aspect of the present disclosure, the sampling unit includes: a curve calculation sub-unit, configured to: obtain the spatial layout of the target environment and determine arrangement positions of audio testing devices based on the spatial layout; perform audio tests on the target environment using full-spectrum audio signals and obtain test data of each arrangement position to obtain the acoustic characteristic data of the target environment; generate a frequency response curve of the target environment based on the acoustic characteristic data, and obtain the environmental optimization parameter of the target environment based on the frequency response curve.

Optionally, in a fifth implementation of the second aspect of the present disclosure, the sampling unit further includes: a model establishing sub-unit, configured to: obtain the spatial layout of the target environment and determine arrangement positions of audio testing devices based on the spatial layout; perform audio tests on the target environment using full-spectrum audio signals and obtain test data of each arrangement position to obtain the acoustic characteristic data of the target environment; establish an acoustic transfer model of the target environment based on the acoustic characteristic data, perform iterative adjustments on the audio parameter of the audio system, and obtain, based on a comparison result between an audio effect corresponding to each of iteratively adjusted audio parameters and the target audio effect, the environmental optimization parameter of the target environment.

Optionally, in a sixth implementation of the second aspect of the present disclosure, the model establishing sub-unit is further configured to: obtain audio data of full-spectrum audio signals for audio testing and extract the test data of each arrangement position from the acoustic characteristic data; and perform, based on the audio data and the test data, machine learning to establish the acoustic transfer model of the target environment.

Optionally, in a seventh implementation of the second aspect of the present disclosure, the model establishing sub-unit is further configured to: perform iterative adjustments on the audio parameter of the audio system based on an optimization algorithm, and perform audio tests based on the iteratively adjusted audio parameters and the acoustic transfer model to obtain audio effects corresponding to the audio parameters respectively; select an audio effect that matches the target audio effect from the audio effects to obtain an effective audio effect, and obtain the environmental optimization parameter of the target environment based on an audio parameter corresponding to the effective audio effect.

Optionally, in an eighth implementation of the second aspect of the present disclosure, the second calculation module includes: a splitting unit, configured to perform numerical splitting on the environmental optimization parameter to identify an optimization parameter item and a corresponding optimization parameter value; and a value determining unit, configured to optimize, based on the optimization parameter item and the corresponding optimization parameter value, the audio metric parameter to calculate the optimization parameter of the audio system.

Optionally, in a ninth implementation of the second aspect of the present disclosure, the adjustment module includes: a sending unit, configured to generate adjustment control instructions based on the optimization parameter, and send the adjustment control instructions to the audio system to perform equalizer setting on the audio system and adjust an audio parameter of the audio system.

Optionally, in a tenth implementation of the second aspect of the present disclosure, the sending unit is further configured to: obtain an interface format of the audio system and perform format conversion on the optimization parameter based on the interface format, and generate the adjustment control instructions of the audio system; send the adjustment control instructions to the equalizer of the audio system and perform equalizer setting on the audio system by adjusting a value of the equalizer to adjust the audio parameter of the audio system.

Optionally, in an eleventh implementation of the second aspect of the present disclosure, the adjustment module further includes: a correspondence unit, configured to generate a correspondence between a preset acoustic transfer model and the audio metric parameter, and create a model audio configuration database.

In a third aspect, the present disclosure provides an audio parameter adjustment device, including a memory and at least one processor, where instructions are stored in the memory; the at least one processor calls the instructions in the memory to cause the audio parameter adjustment device to implement steps of the above-mentioned audio parameter adjustment method.

In a fourth aspect, the present disclosure provides a computer-readable storage medium having stored thereon instructions, where the instructions implement, when executed by a processor, steps of the above-mentioned audio parameter adjustment method.

DETAILED DESCRIPTION OF THE EMBODIMENTS

In view of the existing audio parameter adjustment manner, in the present disclosure, the target audio effect of the audio system is analyzed to obtain a corresponding audio metric parameter, an environmental optimization parameter of a target environment where the audio system is currently located is calculated, based on the audio metric parameter and the environmental optimization parameter, an optimization parameter of the audio system is calculated, and adaptive adjustment is performed on the audio system based on the optimization parameter of the audio system. In this solution, the acoustic characteristic data of the target environment is collected through a test signal, and a customized parameter configuration scheme is calculated by using a digital filtering algorithm, so as to adjust the audio effect of the speaker in real-time, thereby achieving optimization of the speaker's parameters based on the acoustic characteristics of different target environments. In this case, it provides a more personalized and immersive music experience by extending closed tuning to open space scenarios, so as to provide the intelligent audio optimization for different target environments.

Terms such as "first", "second", "third" and "fourth" (if any) in the description, claims and drawings of the present disclosure are used to differentiate similar objects, and not necessarily used to describe a specific sequence or order. It should be appreciated that the data used in this way may be interchanged under an appropriate circumstance, so that the embodiment of the present disclosure described herein, for example, may be implemented in a sequence other than those illustrated or described herein. Moreover, terms "include", "have" and any other variation thereof are intended to encompass non-exclusive inclusion, such that a process, method, system, product or device including a series of steps or units includes not only those steps or elements, but also other steps or units not explicitly listed, or steps or units inherent in the process, method, system, product or device.

Figure 1:
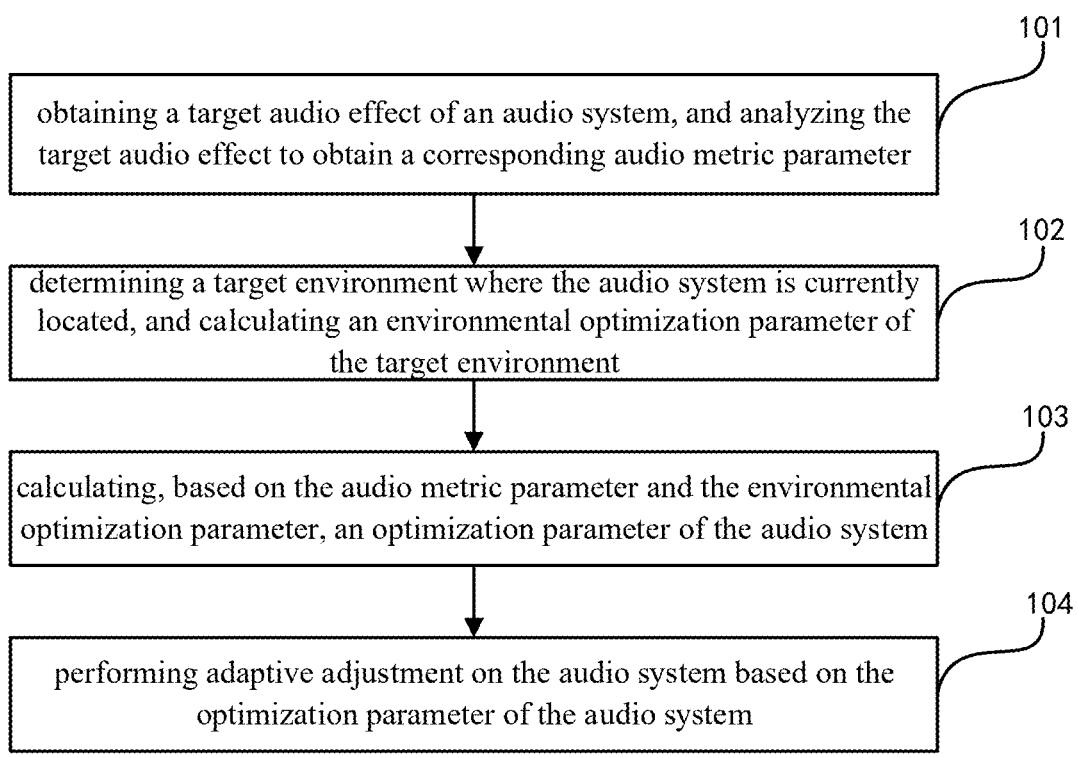
FIG. 1 is a schematic diagram of a first embodiment of an audio parameter adjustment method according to the embodiments of the present disclosure.

To facilitate comprehension, the specific process of the embodiments of the present application is described below. Please refer to FIG. 1, which is a schematic diagram of a first embodiment of an audio parameter adjustment method according to the embodiments of the present disclosure. The method specifically includes the following steps.

Step 101, obtaining a target audio effect of an audio system, and analyzing the target audio effect to obtain a corresponding audio metric parameter.

Performance metrics of the audio system are obtained, the target audio effect of the audio system is determined based on the performance metrics, the target audio effect is analyzed by using an audio editing and analysis software to determine properties of the target audio effect, splitting is performed on the properties of the target audio effect to obtain the audio metric parameter of the audio system under the target audio effect. The performance metrics include the quantity of channels, a quantization bit depth, a sampling rate, a signal-to-noise ratio, a total harmonic distortion, a frequency response, a dynamic range, stereo separation, impedance, power and etc. The target audio effect is an audio effect outputted by the audio system when playing an original audio based on pre-set performance metrics. The target audio effect includes clearness, balance, loudness, timbre, spaciousness, and stereo effect of the output audio. The audio metric parameter is a parameter value of an ideal playback effect that the audio system reaches to achieve in an ideal condition.

In another possible implementation, performance metrics are obtained from a system setting of the audio system, target effect parameters of the audio system are determined based on the performance metrics, where the target effect parameters include frequency response range, distortion level, dynamic range, etc. Based on the target effect parameters, setting parameter values of the audio system are determined, where the setting parameter values include equalizer parameters, compressor parameters, etc. The target audio effect of the audio system is determined based on the setting parameter values of the audio system and test audio signals. A sample of the target audio effect is inputted into a selected audio editing and analysis software for audio effect analysis. In specific, a spectrum distribution of the target audio effect is observed through a spectrum analysis tool in the software. The enhancement or attenuation in a specific frequency band, as well as any harmonic structure that may exist, are identified through the spectrum diagram. The waveform diagram of the target audio effect is observed to analyze such characteristics as amplitude, period, and phase of the signal. Through the waveform, a dynamic change, transient response, and any distortion or noise that may be present in the signal are identified. A dynamic analysis tool, such as a compressor or a limiter, is used to evaluate such parameters as the dynamic range, a compression ratio, and release time of the target audio effect. In a case where the target audio effect involves stereo processing, such as reverb, echo, or stereo width adjustment, a stereo analysis tool is used to evaluate the properties of these effects, analyze the balance, phase relationship, and spaciousness between the left and right channels to understand the presentation and quality of the stereo effect. Based on the above analysis, the properties of the target audio effect are determined, where the properties include a frequency response characteristic, a dynamic processing characteristic, a stereo processing characteristic, distortion and noise. Splitting and metric parameter mapping is performed based on the properties of the target audio effect to obtain the audio metric parameter. In specific, the frequency response characteristic is mapped to an enhanced or attenuated frequency band, the dynamic processing characteristic is mapped to a compression ratio, release time and attack time, the stereo processing characteristic is mapped to a stereo width, a reverb depth and echo time, and distortion and noise characteristic is mapped to harmonic distortion, intermodulation distortion and background noise level. After obtaining initial audio metric parameters, these parameters are refined and optimized based on the characteristics and limitations of the audio system.

Step 102, determining a target environment where the audio system is currently located, and calculating an environmental optimization parameter of the target environment.

The environmental optimization parameter refers to a corresponding adjustment parameter value of the audio system due to the effect of a structure in the environment on audio propagation. In this solution, the environmental optimization parameter of the target environment may be directly calculated by assessing the impact of the target environment on audio propagation. In some embodiments of the present disclosure, an acoustic transfer model of the target environment may be established, iterative adjustments are performed on the audio parameter, and the environmental optimization parameter is determined based on the iteratively adjusted audio parameter.

In a possible implementation, data of the target environment is collected, including a size and a shape, a material absorption coefficient, an ambient noise level, reflective and diffusive surfaces of the environment. The data of target environment is inputted into an acoustic simulation software, to simulate sound wave propagation paths and reflections in the environment. Based on the size and material absorption coefficient of the environment, the reverberation time is calculated. Next, it is simulated how different frequencies propagate and attenuate in the environment, to obtain a frequency response curve. Based on the frequency response curve, it is determined which frequency band needs enhancement or attenuation and it is converted into equalizer setting parameter. Based on the target audio effect, reverberation time and ambient noise level, the reverberation characteristic of the target environment is converted into the audio parameter of the audio system, so as obtain the environmental optimization parameters of the target environment.

In another possible implementation, the acoustic transfer model of the target environment is established based on the spatial layout of the target environment, initial audio parameters, such as equalizer settings, reverberation time, and noise suppression, are set according to the target audio effect. The initial parameters are applied to the acoustic transfer model and simulation tests are conducted. Next, a difference between the simulation result and the target audio effect is analyzed, and the audio parameter is adjusted based on the difference between the simulation result and the target audio effect. The processes of simulation testing and parameter adjustment are repeated. During the iterative adjustment process, the audio parameter of each simulation and the corresponding result are recorded, so as to determine a combination of audio parameters that best achieves the target audio effect, thereby to obtain the environmental optimization parameter of the target environment.

Step 103, calculating, based on the audio metric parameter and the environmental optimization parameter, an optimization parameter of the audio system.

Numerical splitting is performed on the audio metric parameter and the environmental optimization parameter to identify various parameter items and respective corresponding parameter values, the parameter items with inconsistent values between the audio metric parameter and the environmental optimization parameter are compared, an optimization parameter item that needs to be optimized within each parameter is determined, and the corresponding optimization parameter value for each optimization parameter item is obtained. Next, the optimization parameter item and the optimization parameter value are combined to obtain the optimization parameter of the audio system.

When combining the optimization parameter item and the optimization parameter value, an optimization parameter of the equalizer in the audio system is calculated based on the equalizer setting in the audio metric parameter and the frequency response characteristic that may affect the equalizer in the environmental optimization parameter. For an optimization parameter of dynamic processing, the optimization parameter of such dynamic processing component as a compressor, a limiter, or an automatic gain control (AGC) in the audio system is calculated by combining the dynamic processing requirements from the audio metric parameter with the reverberation time and echo effect that may affect the dynamic processing component in the environmental optimization parameter. For an optimization parameter of stereo processing, the optimization parameter of such stereo processing component as stereo width adjustment and reverb depth control in the audio system is calculated based on the stereo processing requirements from the audio metric parameter and the stereo propagation effect that may affect the stereo processing component in the environmental optimization parameter. For input and output parameter adjustments, the input and output parameters of the audio system, such as gain control and noise suppression, are adjusted based on the acoustical improvement measures suggested in the environmental optimization parameter, so as to better adapt to the acoustic characteristic of the environment. In specific, numerically splitting is performed on the environmental optimization parameter and audio metric parameter, including a frequency point and a gain value in the equalizer parameters; a compression ratio, threshold, attack time and release time in dynamic processing parameters; and stereo width and reverb depth in stereo processing parameters. The audio metric parameter with the environmental optimization parameter are compared by individually comparing parameter values of the equalizer, dynamic processing, and stereo processing. Items with inconsistent values or items needing adjustment are identified, for example, a setting value of the equalizer is not matched, and it is determined that a setting parameter item of the equalizer requires optimization. For the parameter item with inconsistent values, the audio metric parameter is adjusted according to the parameter value in the environmental optimization parameter. The optimization parameter item and the corresponding optimization value are recorded to form an audio system optimization table, thereby obtaining the optimization parameter of the audio system.

Step 104, performing adaptive adjustment on the audio system based on the optimization parameter of the audio system.

The optimization parameter of the audio system is a parameter value that requires to be adjusted for the audio system in order to make the audio signal played by the audio system reaches a preset metric parameter of the audio system in the target environment. Adjustment control instructions are generated based on the optimization parameter, and the adjustment control instructions are sent to the audio system, so as to perform equalizer setting on the audio system and adjust an audio parameter of the audio system. An interface format of the audio system is obtained and format conversion is performed on the optimization parameter based on the interface format, and the adjustment control instructions of the audio system are generated. Next, the adjustment control instructions are sent to the equalizer of the audio system and equalizer setting is performed on the audio system by adjusting a value of the equalizer, so as to adjust the audio parameter of the audio system. Specifically, the optimization parameter item and the corresponding optimization parameter value are mapped to a control parameter recognizable by the audio system. For example, a gain value of each frequency band of the equalizer is mapped to a specific value on an equalizer control interface of the audio system. According to a control protocol or API (application programming interface) of the audio system, corresponding adjustment control instructions are generated, where the adjustment control instructions include the specific parameter item and corresponding parameter value. The generated adjustment control instructions are verified to ensure that their format is correct, the parameter values are within a reasonable range, and match the control requirements of the audio system. A control device (such as a computer, a mobile device or a dedicated controller) is connected to the audio system through an appropriate connection manner (such as wired connection, wireless connection, network connection, etc.), through the control software or API provided by the audio system, the verified adjustment control instructions are sent to the audio system, and waited for the audio system to confirm, which is usually expressed as an update of a system interface, a change of a status indicator or a returned confirmation message. Based on the adjustment control instructions, the audio system may adjust its equalizer setting, including adjusting a gain value of each frequency band to improve the frequency response characteristic of the audio. In addition to the equalizer setting, other audio parameters may also be adjusted according to the optimization parameters, such as dynamic processing parameters (a compression ratio, threshold, etc.), stereo processing parameters (stereo width, reverb depth, etc.). The interface format of the audio system is obtained, and the optimization parameter items are mapped to corresponding parameter identifiers or labels in the audio system interface format, and the optimization parameter values are encoded according to interface format requirements, and the adjustment control instructions are constructed in combination with a control command structure of the audio system and the encoded optimization parameter values. The adjustment control instructions include a necessary command header, a parameter identifier and a parameter value, as well as a possible check code or terminator. By using a programming language or script tool, a specific adjustment control instruction string or data packet is generated according to the constructed adjustment control instruction structure. A suitable communication manner (such as serial communication, network communication, etc.) is selected according to the interface format of the audio system, and the generated adjustment control instructions are sent to the audio system. This usually involves such steps as opening the communication port, configuring communication parameters (such as baud rate, data bit, etc.), sending instruction data, and closing the communication port. After receiving the adjustment control instructions, the audio system analyzes the parameter identifier and parameter value in the instructions. According to the parameter value obtained by the analysis, the equalizer automatically adjusts the gain value of each frequency band to optimize the audio parameters of the audio system.

In this solution, it realizes the capability of a smart speaker system to intelligently calculate customized audio parameter configuration solutions based on the acoustic characteristics of different actual environments. In this embodiment, test units, i.e., audio test devices, are arranged in the environment, so as to obtain audio samples at different points and analyze and process the audio samples, thereby to effectively restore the acoustic transfer model of the environment, and to obtain the reflection, dispersion and other effect parameters of sound waves in this specific environment. This is the basis for constructing a high-precision digital environment model. The key technologies include a test signal frequency response analysis approach based on fast Fourier transform and transfer function theory. After obtaining an environmental acoustic model, the system calls a digital filter algorithm tailored for equalizer parameter optimization, for example, a biquad IIR filter structure is used, and multi-parameter fitting is performed through such manners as simulated annealing. This can accurately calculate the customized equalizer setting required for the speaker system in the environment, thereby making targeted adjustments to the audio source signal. The calculation process can be automated without manual intervention. Finally, the system applies the parameter setting to the digital filter running on the speaker, forming a closed-loop feedback control to optimize the audio effect in real time. In addition, it can collect configurations from multiple environments as reference cases to build a database. In conclusion, this solution overcomes the limitation of being unable to intelligently optimize speaker audio parameters for open spaces, achieving the capability to automatically calculate customized parameters using the digital filtering algorithm based on measured environmental acoustic models. This accomplishes the goal of personalized audio effect optimization, significantly enhancing user experience.

Figure 2:
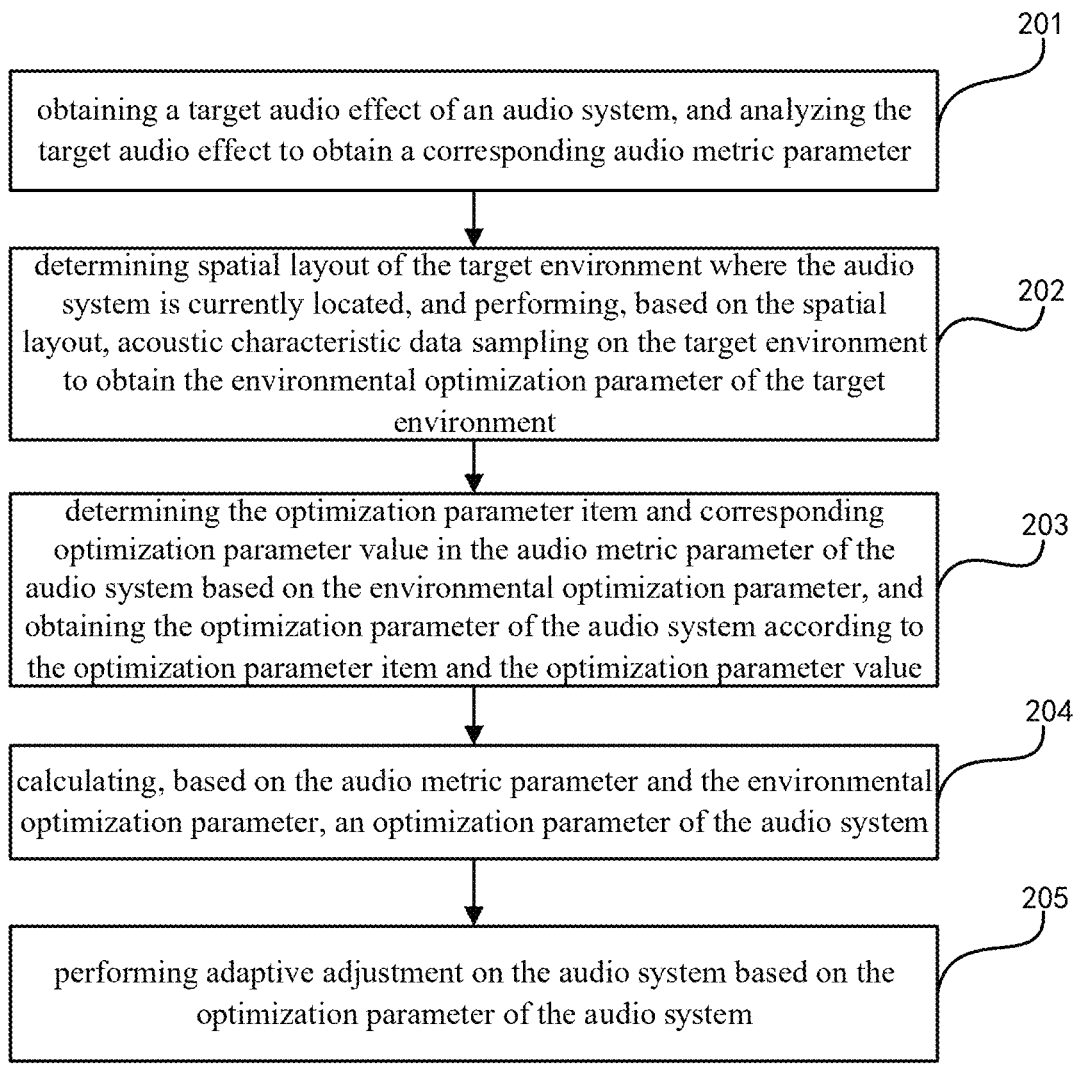
FIG. 2 is a schematic diagram of a second embodiment of the audio parameter adjustment method according to the embodiments of the present disclosure.

Please refer to FIG. 2, which is a schematic diagram of a second embodiment of the audio parameter adjustment method according to the embodiments of the present disclosure. The method specifically includes the following steps.

Step 201, obtaining a target audio effect of an audio system, and analyzing the target audio effect to obtain a corresponding audio metric parameter.

The target audio effect of the audio system is obtained based on performance metrics of the audio system, the target audio effect is analyzed to determine the equalizer setting of the audio system corresponding to the target audio effect, and based on the equalizer setting, the audio metric parameter of the audio system under the target audio effect is obtained.

Specifically, the target audio effect is analyzed, and the spectrum analysis of the target audio effect is determined. According to the spectrum analysis result, the frequency band that requires to be adjusted is selected. For example, in a case that the low-frequency effect is to be enhanced, the low-frequency band (such as 60-250 Hz) is paid attention to. According to the requirements of the target audio effect, a suitable gain value is set for each selected frequency band. In a case that the target effect is warm, it may require to increase the gain in the low and mid-frequency. In a case that the target effect is bright, it may require to increase the gain in the high frequency. Through Q value adjustment, the gain in a specific frequency region is finely controlled. Through curve smoothing, it is ensured that the gain adjustment smoothly transitions between frequency bands. Based on the spectrum analysis result, the equalizer setting of the audio system corresponding to the target audio effect is determined, and the audio metric parameter of the audio system under the target audio effect is obtained according to the equalizer setting. The equalizer setting includes frequency band selection, gain adjustment, Q value adjustment and phase distortion adjustment. A type of equalizer is identified by software, and the equalizer setting of the audio system is determined based on the type of the equalizer and audio distribution. The audio metric parameter of the audio system under the target audio effect is obtained according to the equalizer setting. First, the audio analysis software is used to identify the type of the equalizer in the audio system, and the frequency response characteristic, filtering manner and control parameter of the equalizer are determined. Next, the distribution of the audio signal and the spectral characteristics of the distribution are analyzed. The setting of the equalizer is determined based on the type of the equalizer and the analysis result of audio distribution. Finally, the audio metric parameter of the audio system under the target audio effect is measured and calculated.

Step 202, determining spatial layout of the target environment where the audio system is currently located, and performing, based on the spatial layout, acoustic characteristic data sampling on the target environment to obtain the environmental optimization parameter of the target environment.

The spatial layout of the target environment where the audio system is currently located is determined, and based on the spatial layout, acoustic characteristic data sampling is performed on the target environment to obtain the environmental optimization parameter of the target environment. The spatial layout of the target environment is obtained and arrangement positions of audio testing devices are determined based on the spatial layout. Next, audio tests are performed on the target environment using full-spectrum audio signals and test data of each arrangement position is obtained to obtain the acoustic characteristic data of the target environment. A frequency response curve of the target environment is generated based on the acoustic characteristic data, and the environmental optimization parameter of the target environment is obtained based on the frequency response curve. In some embodiments of the present disclosure, the spatial layout of the target environment is obtained and arrangement positions of audio testing devices are determined based on the spatial layout. Next, audio tests are performed on the target environment using full-spectrum audio signals and test data of each arrangement position is obtained to obtain the acoustic characteristic data of the target environment. An acoustic transfer model of the target environment is established based on the acoustic characteristic data, iterative adjustments are performed on the audio parameter of the audio system, and based on a comparison result between an audio effect corresponding to each of iteratively adjusted audio parameters and the target audio effect, the environmental optimization parameter of the target environment is obtained.

Specifically, the test data of the audio test device at each arrangement position is collected to obtain the acoustic characteristic data, the collected acoustic characteristic data is processed, a sound pressure level or a response value of each frequency point is extracted, and a drawing software or tool is used to draw a frequency response curve with frequency as the horizontal axis and sound pressure level or response value as the vertical axis. A shape, peak and valley positions and change trends of the frequency response curve are observed to understand the acoustic characteristics of the target environment. A frequency band or frequency point that needs to be optimized is determined according to the analysis results of the frequency response curve, and the environment optimization parameter is calculated based on the analysis results of the frequency response curve and the optimization target. In some embodiments of the present disclosure, acoustic characteristic data of the target environment, including sound pressure level, reflection coefficient, reverberation time, etc. at different frequencies, are collected and processed to extract key parameters, and eliminate noise and interference. An acoustic transfer model of the target environment is generated based on the collected data using an acoustic software or programming tool. This model is capable of describing the propagation, reflection, and attenuation characteristics of sound waves in the environment. The environmental optimization parameter of the target environment is calculated based on the basic configuration and preset parameters of the audio system and the acoustic transfer model.

Step 203, determining the optimization parameter item and corresponding optimization parameter value in the audio metric parameter of the audio system based on the environmental optimization parameter, and obtaining the optimization parameter of the audio system according to the optimization parameter item and the optimization parameter value.

Numerical splitting is performed on the audio metric parameter and the environmental optimization parameter to identify various parameter items and respective corresponding parameter values, the parameter items with inconsistent values between the audio metric parameter and the environmental optimization parameter are compared, an optimization parameter item that needs to be optimized within each parameter is determined, and the corresponding optimization parameter value for each optimization parameter item is obtained. Next, the optimization parameter item and the optimization parameter value are combined to obtain the optimization parameter of the audio system.

Step 204, calculating, based on the audio metric parameter and the environmental optimization parameter, an optimization parameter of the audio system.

Numerical splitting is performed on the audio metric parameter and the environmental optimization parameter to identify various parameter items and respective corresponding parameter values, the parameter items with inconsistent values between the audio metric parameter and the environmental optimization parameter are compared, an optimization parameter item that needs to be optimized within each parameter is determined, and the corresponding optimization parameter value for each optimization parameter item is obtained. Next, the optimization parameter item and the optimization parameter value are combined to obtain the optimization parameter of the audio system.

Step 205, performing adaptive adjustment on the audio system based on the optimization parameter of the audio system.

Adjustment control instructions are generated based on the optimization parameter, and the adjustment control instructions are sent to the audio system, so as to perform equalizer setting on the audio system and adjust an audio parameter of the audio system.

In this solution, the environmental acoustic characteristic data is collected through a test signal, and a customized parameter configuration scheme is calculated by using a digital filtering algorithm, so as to adjust the audio effect of the speaker in real-time, thereby to provide the intelligent audio optimization for different environments.

Figure 3:
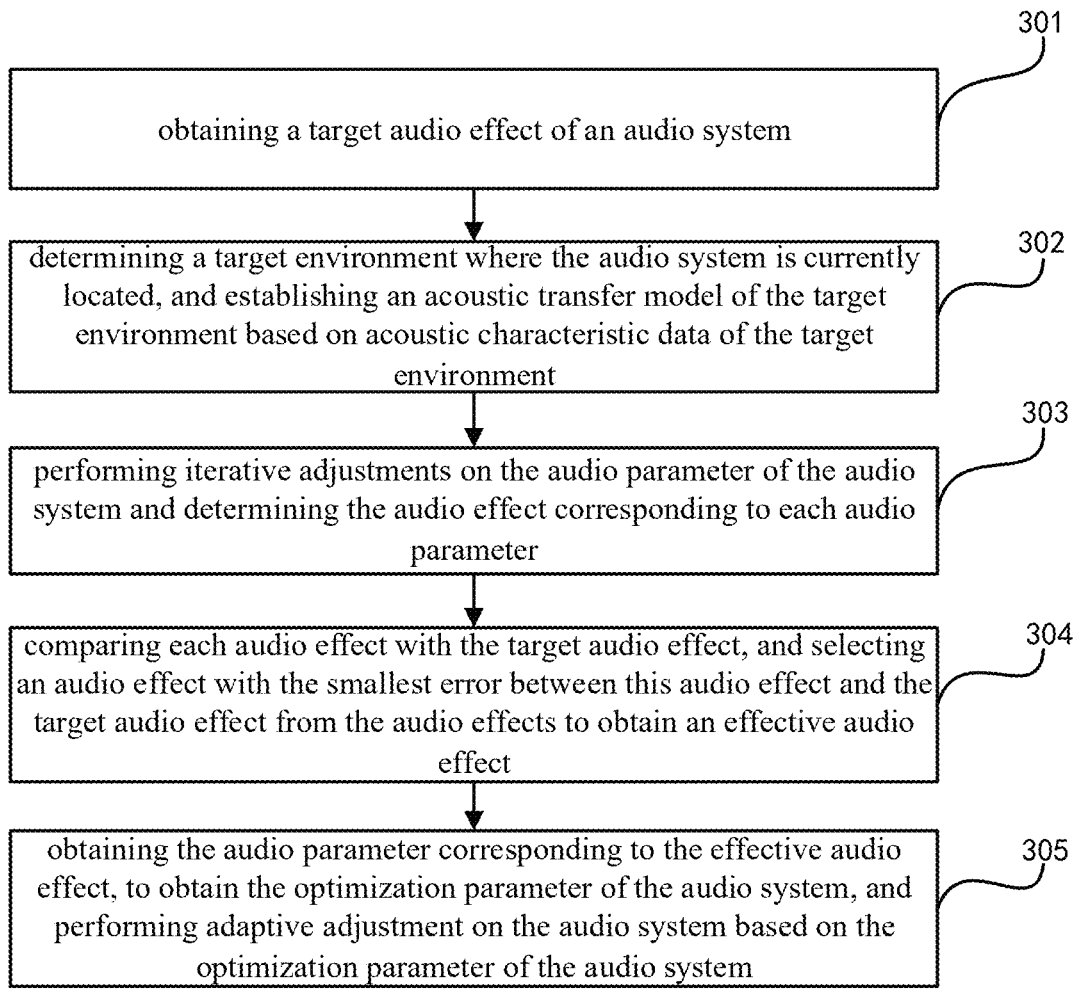
FIG. 3 is a schematic diagram of a third embodiment of the audio parameter adjustment method according to the embodiments of the present disclosure.

Please refer to FIG. 3, which is a schematic diagram of a third embodiment of the audio parameter adjustment method according to the embodiments of the present disclosure. The method specifically includes the following steps.

Step 301, obtaining a target audio effect of an audio system.

Performance metrics of the audio system are obtained, the target audio effect of the audio system is determined based on the performance metrics. Specifically, the performance metrics of the audio system are loaded, frequency response data of the audio system is determined, and an audio performance curve of the audio system is plotted. Based on the test audio, a performance result of the audio in each frequency band based on the audio performance curve is determined to obtain the target audio effect.

Step 302, determining a target environment where the audio system is currently located, and establishing an acoustic transfer model of the target environment based on acoustic characteristic data of the target environment.

The target environment where the audio system is currently located is determined, the spatial layout of the target environment is obtained, and after audio test devices are arranged, audio testing is performed on the target environment and test data is collected to obtain acoustic characteristic data of the target environment. An acoustic transfer model is established based on the acoustic characteristic data, where the audio test devices include a speaker and a microphone, and the acoustic transfer model includes parameters such as a volume size of the environment, a wall reflection characteristic, a sound field distribution, and standing waves. In specific, a plurality of sampling points are selected in the target environment, test speakers and microphones are arranged, and test audio signals equipped in the speakers are played with a frequency band covering an entire frequency band. The audio signal at each sampling point is collected using a microphone to obtain frequency response test data of the target environment at the plurality of sampling points. Frequency analysis is performed on the collected test data at the plurality of sampling points, a frequency response curve is extracted, a frequency response difference between different sampling points is analyzed, and the acoustic transfer model of the environment is established. In other words, the audio test devices are arranged in the environment, audio samples at different points are obtained, analyzed and processed, so as to obtain the reflection, dispersion and other effect parameters of sound waves in this specific environment, thereby to establish the acoustic transfer model of the environment. In establishing the acoustic transfer model, key technologies include a test signal frequency response analysis approach based on fast Fourier transform and transfer function theory. The test signal frequency response analysis approach based on fast Fourier transform (FFT) and transfer function theory combines the efficient spectrum analysis capability of FFT and the advantages of transfer function theory in system analysis, thereby achieving accurate analysis in the frequency response of the test signal. Specifically, firstly, the input and output data of the test signal are collected, where the data may be time-domain signals or preprocessed signals. Next, the FFT algorithm is used to perform spectral analysis on the input and output signals, and the input and output signals are converted from the time domain to the frequency domain, so as to obtain amplitude and phase information of the signal on each frequency component. Next, based on the spectral data of the input and output signals, a transfer function of the system is calculated. The transfer function includes the gain and phase information at different frequencies. Finally, by analyzing the transfer function, a frequency response characteristic is obtained, so as to establish the acoustic transfer model. The frequency response characteristic includes a change of a gain of the system with frequency, a change of a phase with frequency, etc.

In practical applications, when it requires to determine the audio parameter of the audio system according to the environment, positions of a speaker and microphones may be determined according to the size and spatial layout of the environment. Generally, the speaker is located in the center of the environment, and microphones are located at multiple different positions in the environment, such as positions 1, 2, and 3. A frequency range of the test audio is 20 Hz-20 kHz, and the test audio uses a sweep signal. Frequency response data of the microphone at each position based on the test audio at each frequency is collected, and the frequency response data is sound responses of the audio test devices at different positions at different frequencies. By comparing the frequency response data at different positions, it can be found that there are differences in the sound field distribution in the environment. For example, the responses at positions 1 and 2 are generally higher than that at position 3, which means that there is acoustic focusing or echo at these positions in the environment. Next, a frequency response curve is plotted based on the frequency response data, the frequency response curve is analyzed, so as to determine a peak or valley value of each position at a certain frequency, and determine a relationship between a resonant frequency or sound absorption performance of the environment and sound propagation. Furthermore, attention is drawn to the differences between the curves, especially the response differences at certain specific frequencies. The influence of the environment on sound propagation is determined based on the frequency response curve, and the acoustic characteristic data of the environment is analyzed, where the acoustic characteristic data includes a geometric shape of the environment, a sound absorption performance of the material, the distribution of reflecting surfaces, and a distance between each test point and a sound source as well as each reflecting surface. The acoustic characteristic data is used as an input parameter, and different acoustic models, such as a geometric acoustic model, a wave acoustic model or a statistical energy model, are selected according to the complexity of the environment and the required accuracy. For example, for an environment with a simple shape, a geometric acoustic model is selected, and for an environment with a complex shape or where a higher accuracy is required, a more complex model is used. A mathematical tool (such as a matrix equation, a finite element method or a boundary element method, etc.) is used to describe the propagation and reflection process of sound waves in the environment, considering boundary conditions and material properties of the environment, the established acoustic transfer model is compared with the actual frequency response test data, and the prediction performance of the model is optimized by adjusting the model parameters.

Step 303, performing iterative adjustments on the audio parameter of the audio system and determining the audio effect corresponding to each audio parameter.

Iterative adjustments are performed on the audio parameter of the audio system based on an optimization algorithm, and audio tests are performed based on the iteratively adjusted audio parameters and the acoustic transfer model to obtain audio effects corresponding to the audio parameters respectively. In specific, after obtaining an environmental acoustic model, a multi-band filter optimization algorithm for optimizing the parametric of the equalizer is used, and multi-parameter fitting is performed using such manners as simulated annealing to calculate the customized equalizer setting required for the audio system in the target environment and determine the audio effect corresponding to each audio parameter.

In practical applications, first, the parameters of the equalizer are initialized based on the characteristics of the audio system and the acoustic transfer model. These parameters may include gains, Q values, etc. for different frequency bands. A target function is defined to evaluate an audio quality in the current equalizer parameter setting. The target function may be constructed based on such factors as the smoothness of the frequency response curve, total harmonic distortion of the speaker system, and sound pressure level distribution in the environment. The system calls a digital filter algorithm tailored for equalizer parameter optimization. This digital filter algorithm simulates the propagation and reflection processes of the audio signal in the environment based on the current equalizer parameters and the acoustic transfer model, calculates a corresponding frequency response characteristic, and based on these frequency response characteristic, determines the audio effect under the audio parameter of each audio system. Multi-parameter fitting is performed on the equalizer parameters through simulated annealing. Simulated annealing is a heuristic search algorithm that can search for a global optima. In this process, it continuously attempts to adjust the parameter of the equalizer and evaluates its quality based on the feedback from the target function. Through multiple iterations, it gradually finds the equalizer parameter setting that optimizes the target function. In each iteration, simulated annealing calculates the audio effect based on the current parameter setting and compares it with the target audio effect, and adjusts the parameter based on the comparison result.

Step 304, comparing each audio effect with the target audio effect, and selecting an audio effect with the smallest error between this audio effect and the target audio effect from the audio effects to obtain an effective audio effect.

Each audio effect is compared with the target audio effect and an error between each audio effect and the target audio effect each is calculated. An audio effect that matches the target audio effect from the audio effects to obtain the effective audio effect. Specifically, the audio effect of the test audio is compared with the target audio effect, and appropriate evaluation metrics are selected, the evaluation metrics including spectrum distribution, loudness, timbre similarity, dynamic range, etc. An error between each audio effect and the target audio effect is calculated according to the selected evaluation metrics. The error calculation can use such methods as absolute error, relative error or mean square error. Calculated error values are analyzed to understand the difference between each audio effect and the target audio effect. The audio effect with the smallest error value with the target audio effect is selected from the audio effects, and is determined as the audio effect that matches the target audio effect, thereby to obtain the effective audio effect. In another possible implementation, an audio performance curve of the audio system is determined based on the performance metrics of the audio system. The acoustic transfer model of the target environment is established based on the target environment. The acoustic transfer model is matched with the audio performance curve, and the audio parameter of the audio system in the current target environment is calculated using a multi-band filter optimization algorithm.

Step 305, obtaining the audio parameter corresponding to the effective audio effect, to obtain the optimization parameter of the audio system, and performing adaptive adjustment on the audio system based on the optimization parameter of the audio system.

The audio parameter corresponding to effective audio effect is obtained, and determined as an audio parameter when the audio signal played by the audio system in the current target environment achieves the target audio playback effect. The current audio parameter of the audio system is obtained, and compared with the audio parameter corresponding to the effective audio effect. It is determined that a parameter item with a difference is a parameter item that needs to be optimized for the audio system, all the parameter items that need to be optimized are combined, to obtain the optimization parameter of the audio system, thereby to perform adaptive adjustment on the audio system based on the optimization parameter of the audio system. Through the performance metrics of the audio system, it is able to obtain the frequency response characteristic, the audio performance curve, the target audio effect and the audio metric parameter of the audio system. In conclusion, the audio parameter of the audio system is adjusted, the frequency response characteristic of each audio parameter based on the acoustic transfer model is obtained, and each frequency response characteristic is compared with a target frequency response characteristic of the audio system. Based on a comparison result and the optimization algorithm, the frequency response characteristic that matches the target frequency response characteristic is selected from frequency response characteristics to obtain an effective frequency response characteristic. A corresponding audio parameter is determined based on the effective frequency response characteristic, and the optimization parameter of the audio system is determined. The frequency response characteristic is a frequency response characteristic of the audio, which is used to describe the response of the audio system to audio signals of different frequencies. Specifically, it reflects changes in the amplitude and phase of the output signals of the audio system when sinusoidal signals of different frequencies are inputted. The frequency response characteristic of the audio usually includes an amplitude-frequency characteristic and a phase-frequency characteristic, where the amplitude-frequency characteristic represents the gain (or attenuation) of signals of different frequencies, and the phase-frequency characteristic represents the phase shift of signals of different frequencies. In some embodiments of the present disclosure, the audio parameter of the audio system is adjusted, the frequency response curve is obtained based on the acoustic transfer model for each audio parameter. Each frequency response curve is compared with the audio performance curve of the audio system. Based on a comparison result and the optimization algorithm, the frequency response curve that matches the audio performance curve is selected to obtain an effective frequency response curve. A corresponding audio parameter is determined based on the effective frequency response characteristic, and the optimization parameter of the audio system is determined. In some embodiments of the present disclosure, the environmental optimization parameter of the environment where the audio system is located is calculated, and adjustments are performed based on the audio metric parameter of the audio system and the environmental optimization parameter to obtain the optimization parameter of the audio system. The audio effect based on the acoustic transfer model under each audio parameter is obtained through adjusting the audio parameter of the audio system, and each audio effect is compared with the target audio effect of the audio system, the audio effect that matches the target audio effect is selected from the audio effects based on a comparison result and the optimization algorithm to obtain an effective audio effect, a corresponding audio parameter is determined based on the effective audio effect, and the optimization parameter of the audio system is determined.

In this solution, it is able to achieve a technical scheme of analyzing and obtaining the audio optimization parameter through obtaining the environmental acoustic characteristic data and adjusting the digital filter in real time, thereby to provide intelligent customization of audio effect optimization for different environments, and to provide a better music experience. It realizes the capability of a smart speaker system to intelligently customize audio parameter configurations based on the actual acoustic characteristics of different environments through test collection, model analysis, and digital filtering algorithm calculations. This breaks through the limitations of existing products where only preset fixed audio effects are applied, thereby achieving the technical effect of personalized audio optimization for open space scenarios.

The audio parameter adjustment method in the embodiments of the present disclosure is described above, and a detailed description of the audio parameter adjustment apparatus in the embodiments of the present disclosure will be given below in the form of modular functional entities. Please refer to FIG. 4, which is a schematic structural diagram of an audio parameter adjustment apparatus according to the embodiments of the present disclosure. The audio parameter adjustment apparatus includes: an analyzing module 410, configured to obtain a target audio effect of an audio system, and analyze the target audio effect to obtain a corresponding audio metric parameter; a first calculating module 420, configured to determine a target environment where the audio system is currently located, and calculate an environmental optimization parameter of the target environment; a second calculating module 430, configured to calculate, based on the audio metric parameter and the environmental optimization parameter, an optimization parameter of the audio system; and an adjustment module 440, configured to perform adaptive adjustment on the audio system based on the optimization parameter of the audio system.

In this solution, the target audio effect of the audio system is analyzed to obtain the corresponding audio metric parameter, the target environment where the audio system is currently located is determined, the environmental optimization parameter of the target environment is calculated, based on the audio metric parameter and the environmental optimization parameter, the optimization parameter of the audio system is calculated, and adaptive adjustment is performed on the audio system based on the optimization parameter of the audio system.

Figure 5:
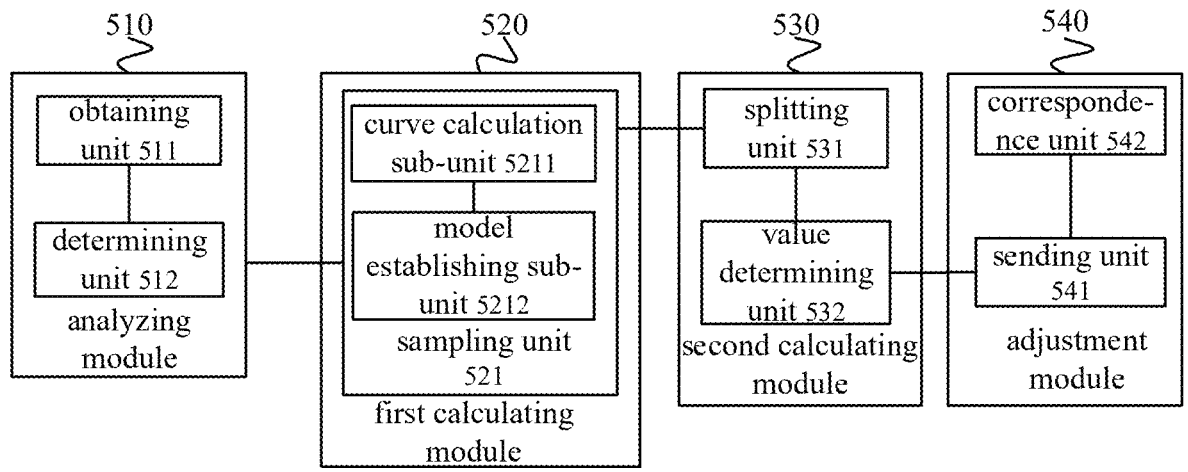
FIG. 5 is another schematic structural diagram of the audio parameter adjustment apparatus according to the embodiments of the present disclosure.

Please refer to FIG. 5, which is another schematic structural diagram of the audio parameter adjustment apparatus according to the embodiments of the present disclosure. The audio parameter adjustment apparatus includes: an analyzing module 510, configured to obtain a target audio effect of an audio system, and analyze the target audio effect to obtain a corresponding audio metric parameter; a first calculating module 520, configured to determine a target environment where the audio system is currently located, and calculate an environmental optimization parameter of the target environment; a second calculating module 530, configured to calculate, based on the audio metric parameter and the environmental optimization parameter, an optimization parameter of the audio system; and an adjustment module 540, configured to perform adaptive adjustment on the audio system based on the optimization parameter of the audio system.

In this embodiment of the present disclosure, the analyzing module 510 includes: an obtaining unit 511, configured to obtain the target audio effect of the audio system based on performance metrics of the audio system; a determining unit 512, configured to analyze the target audio effect to determine the equalizer setting of the audio system corresponding to the target audio effect, and obtain, based on the equalizer setting, the audio metric parameter of the audio system under the target audio effect.

In this embodiment of the present disclosure, the determining unit 512 is further configured to: perform spectral analysis on the target audio effect to obtain an audio distribution under the target audio effect; obtain an equalizer type of the audio system, and determine, based on the equalizer type and the audio distribution, the equalizer setting of the audio system corresponding to the target audio effect.

In this embodiment of the present disclosure, the first calculating module 520 includes: a sampling unit 521, configured to: determine spatial layout of the target environment where the audio system is currently located; and perform, based on the spatial layout, acoustic characteristic data sampling on the target environment to obtain the environmental optimization parameter of the target environment.

In this embodiment of the present disclosure, the sampling unit 521 includes: a curve calculation sub-unit 5211, configured to: obtain the spatial layout of the target environment and determine arrangement positions of audio testing devices based on the spatial layout; perform audio tests on the target environment using full-spectrum audio signals and obtain test data of each arrangement position to obtain the acoustic characteristic data of the target environment; generate a frequency response curve of the target environment based on the acoustic characteristic data, and obtain the environmental optimization parameter of the target environment based on the frequency response curve.

In this embodiment of the present disclosure, the sampling unit 521 further includes: a model establishing sub-unit 5212, configured to: obtain the spatial layout of the target environment and determine arrangement positions of audio testing devices based on the spatial layout; perform audio tests on the target environment using full-spectrum audio signals and obtain test data of each arrangement position to obtain the acoustic characteristic data of the target environment; establish an acoustic transfer model of the target environment based on the acoustic characteristic data, perform iterative adjustments on the audio parameter of the audio system, and obtain, based on a comparison result between an audio effect corresponding to each of iteratively adjusted audio parameters and the target audio effect, the environmental optimization parameter of the target environment.

In this embodiment of the present disclosure, the model establishing sub-unit 5212 is further configured to: obtain audio data of full-spectrum audio signals for audio testing and extract the test data of each arrangement position from the acoustic characteristic data; and perform, based on the audio data and the test data, machine learning to establish the acoustic transfer model of the target environment.

In this embodiment of the present disclosure, the model establishing sub-unit 5212 is further configured to: perform iterative adjustments on the audio parameter of the audio system based on an optimization algorithm, and perform audio tests based on the iteratively adjusted audio parameters and the acoustic transfer model to obtain audio effects corresponding to the audio parameters respectively; select an audio effect that matches the target audio effect from the audio effects to obtain an effective audio effect, and obtain the environmental optimization parameter of the target environment based on an audio parameter corresponding to the effective audio effect.

In this embodiment of the present disclosure, the second calculation module 530 includes: a splitting unit 531, configured to perform numerical splitting on the environmental optimization parameter to identify an optimization parameter item and a corresponding optimization parameter value; and a value determining unit 532, configured to optimize, based on the optimization parameter item and the corresponding optimization parameter value, the audio metric parameter to calculate the optimization parameter of the audio system.

In this embodiment of the present disclosure, the adjustment module 540 includes: a sending unit 541, configured to generate adjustment control instructions based on the optimization parameter, and send the adjustment control instructions to the audio system to perform equalizer setting on the audio system and adjust an audio parameter of the audio system.

In this embodiment of the present disclosure, the sending unit 541 is further configured to: obtain an interface format of the audio system and perform format conversion on the optimization parameter based on the interface format, and generate the adjustment control instructions of the audio system; send the adjustment control instructions to the equalizer of the audio system and perform equalizer setting on the audio system by adjusting a value of the equalizer to adjust the audio parameter of the audio system.

In this embodiment of the present disclosure, the adjustment module 540 further includes: a correspondence unit 542, configured to generate a correspondence between a preset acoustic transfer model and the audio metric parameter, and create a model audio configuration database.

In this solution, the environmental acoustic characteristic data is collected through a test signal and a customized parameter configuration scheme is calculated by using a digital filtering algorithm, so as to adjust the audio effect of the speaker in real-time, thereby achieving optimization of the speaker's parameters based on the acoustic characteristics of different environments. In this case, it provides a more personalized and immersive music experience by extending closed tuning to open space scenarios, so as to provide the intelligent audio optimization for different environments, thereby to enhance user experience.

Figure 4:
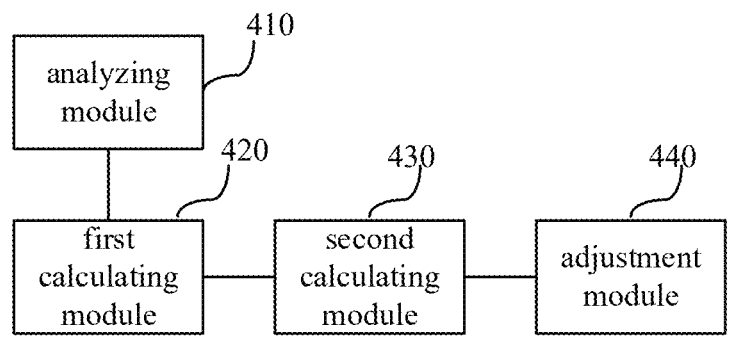
FIG. 4 is a schematic structural diagram of an audio parameter adjustment apparatus according to the embodiments of the present disclosure.

In FIGS. 4-5, the audio parameter adjustment apparatus in the embodiments of the present disclosure is described in detail in the form of modular functional entities, and the following describes in detail an audio parameter adjustment device in the embodiments of the present disclosure in the form of hardware processing.

Figure 6:
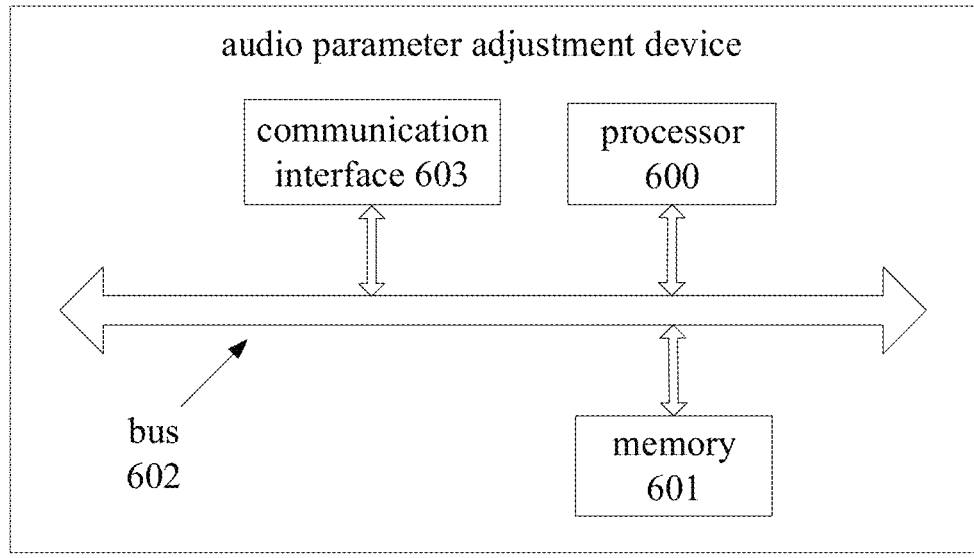
FIG. 6 is a schematic structural diagram of an audio parameter adjustment device according to the embodiments of the present disclosure.

As shown in FIG. 6, the audio parameter adjustment device includes a processor 600 and a memory 601. The memory 601 stores machine executable instructions that can be executed by the processor 600, the machine executable instructions, when executed by the processor 600, cause the processor 600 to implement the above audio parameter adjustment method.

Furthermore, the audio parameter adjustment device in FIG. 6 further includes a bus 602 and a communication interface 603, and the processor 600, the communication interface 603 and the memory 601 are connected via the bus 602.

The memory 601 may include a high-speed random access memory (RAM), or a non-volatile memory (non-volatile memory), for example, at least one disk storage. The communication connection between the system network element and at least one other network element is realized through at least one communication interface 603 (which may be wired or wireless), and the Internet, wide area network, local area network, metropolitan area network, etc. may be used. The bus 602 may be an Industry Standard Architecture (ISA) bus, a Peripheral Component Interconnect (PCI) bus, or an Extended Industry Standard Architecture (EISA) bus, etc. The bus may be categorized as an address bus, a data bus, a control bus, etc. For ease of representation, only one bidirectional arrow is used in FIG. 6, but it does not mean that there is only one bus or one type of bus.

The processor 600 may be an integrated circuit with signal processing capability. In the implementation process, the various steps of the above method may be implemented by an integrated logic circuit of the processor 600 in hardware form or implemented by instructions in the form of software in the processor 600. The processor 600 may be a general-purpose processor, including a central processing unit (CPU), a network processor (NP), etc. The processor 600 may also be a digital signal processor (DSP), an application specific integrated circuit (ASIC), a field programmable gate array (FPGA) or any other programmable logic device, discrete gate or transistor logic device, discrete hardware component. Various methods, steps and logic block diagrams in the embodiments of the present disclosure may be implemented or carried out. The general processor may be a micro-processor or any conventional processor, etc. The steps of the method in the embodiments of the present disclosure may be directly implemented by a hardware decoding processor, or implemented by a combination of hardware and software modules in the decoding processor. The software modules may be located in a storage medium well-known in the art, such as a random access memory, a flash memory, a read-only memory, a programmable read-only memory, or an electrically erasable programmable memory, a register. The storage medium is located in the memory 601, and the processor 600 reads the information in the memory 601 and finishes the method steps of the above-mentioned embodiment in combination with its hardware.

The present disclosure further provides a computer-readable storage medium, which may be a non-volatile computer-readable storage medium or a volatile computer-readable storage medium. The computer-readable storage medium may be a volatile computer-readable storage medium having stored thereon instructions, the instructions, when executed on a computer, cause the computer to implement the various steps of the audio parameter adjustment method in the above-mentioned embodiments.

Those skilled in the art may clearly understand that, for the sake of convenience and brevity of description, the specific working process of the device, apparatus or unit mentioned above can refer to the corresponding processes in the method embodiments, which are not repeated herein.

If the integrated unit is implemented in the form of software functional units and sold or used as an independent product, it may be stored in a computer readable storage medium. Based on this understanding, essence of the technical solutions of the present application, or the part contributing to the prior art, or all or part of the technical solutions, may be embodied in the form of a software product. The computer software product is stored in a storage medium, and includes a number of instructions to enable a computer device (which may be a personal computer, a server, or a network device, etc.) to perform all or part of the steps of method described in the various embodiments of the present application. The storage medium includes a USB flash disk, a mobile hard disk, a read-only memory (Read-Only Memory, ROM), a random access memory (Random Access Memory, RAM), a magnetic disk, an optical disk, or other medium which can store program code.

The above embodiments are only used to illustrate the technical solutions of the present application, but shall not be construed as limiting the present application. As can be appreciated by a person skilled in the art, although the present disclosure has been described in detail with reference to the foregoing embodiments, any modifications or variations of the technical solutions in the aforementioned embodiments, or equivalent replacements of part of the technical features within the scope of the disclosed technology, may still be made by those skilled in the art. These modifications or replacements do not make the essence of the corresponding technical solutions depart from the spirit and scope of the technical solutions of the embodiments of the present application.

What is claimed is:

1. An audio parameter adjustment method, comprising:
obtaining a target audio effect of an audio system, and analyzing the target audio effect to obtain a corresponding audio metric parameter;
determining a target environment where the audio system is currently located, and calculating an environmental optimization parameter of the target environment;
calculating, based on the audio metric parameter and the environmental optimization parameter, an optimization parameter of the audio system; and
performing adaptive adjustment on the audio system based on the optimization parameter of the audio system;
wherein obtaining the target audio effect of the audio system, and analyzing the target audio effect to obtain the corresponding audio metric parameter comprises:
obtaining performance metrics from a system setting of the audio system, determining the target audio effect of the audio system based on the performance metrics, inputting a sample of the target audio effect into a selected audio editing and analysis software, and performing audio effect analysis to obtain a spectrum distribution of the target audio effect, wherein the spectrum distribution comprises a spectrum diagram and a waveform diagram; and
performing analysis based on the spectrum diagram and the waveform diagram;
wherein performing analysis based on the spectrum diagram and the waveform diagram comprises:
identifying the enhancement or attenuation of a specific frequency band, and a harmonic structure of the specific frequency band through the spectrum diagram;
analyzing an amplitude, a period, and a phase of a signal through the waveform diagram; and
identifying a dynamic change, transient response, and distortion or noise in the signal through the waveform diagram;
wherein the method further comprises:
determining properties of the target audio effect based on an analysis result, wherein the properties comprise a frequency response characteristic, a dynamic processing characteristic, a stereo processing characteristic, distortion and noise; and
performing splitting and metric parameter mapping based on the properties of the target audio effect to obtain the audio metric parameter;
wherein performing splitting and metric parameter mapping comprises:
mapping the frequency response characteristic to an enhanced or attenuated frequency band;
mapping the dynamic processing characteristic to a compression ratio, release time, and attack time;
mapping the stereo processing characteristic to a stereo width, a reverb depth and echo time; and mapping distortion and noise characteristic to harmonic distortion, intermodulation distortion and background noise level;

wherein determining the target environment where the audio system is currently located, and calculating the environmental optimization parameter of the target environment comprises:

determining spatial layout of the target environment where the audio system is currently located; and performing, based on the spatial layout, acoustic characteristic data sampling on the target environment to obtain the environmental optimization parameter of the target environment;

wherein determining the spatial layout of the target environment where the audio system is currently located, and performing acoustic characteristic data sampling on the target environment based on the spatial layout to obtain the environmental optimization parameter of the target environment comprises:

obtaining the spatial layout of the target environment and determining arrangement positions of audio testing devices based on the spatial layout;

performing audio tests on the target environment using full-spectrum audio signals and obtaining test data of each arrangement position to obtain the acoustic characteristic data of the target environment; and obtaining the environmental optimization parameter of the target environment based on the acoustic characteristic data;

wherein calculating, based on the audio metric parameter and the environmental optimization parameter, the optimization parameter of the audio system comprises:

performing numerical splitting on the environmental optimization parameter to identify an optimization parameter item and a corresponding optimization parameter value; and optimizing, based on the optimization parameter item and the corresponding optimization parameter value, the audio metric parameter to calculate the optimization parameter of the audio system;

wherein performing adaptive adjustment on the audio system based on the optimization parameter of the audio system comprises:

generating adjustment control instructions based on the optimization parameter, and sending the adjustment control instructions to the audio system to perform equalizer setting on the audio system and adjust an audio parameter of the audio system;

wherein the method further comprises:

subsequent to performing adaptive adjustment on the audio system based on the optimization parameter of the audio system, generating a correspondence between a preset acoustic transfer model and the audio metric parameter, and creating a model audio configuration database.

2. The audio parameter adjustment method according to claim 1, wherein obtaining the environmental optimization parameter of the target environment based on the acoustic characteristic data comprises:

generating a frequency response curve of the target environment based on the acoustic characteristic data, and obtaining the environmental optimization parameter of the target environment based on the frequency response curve.

3. The audio parameter adjustment method according to claim 1, wherein obtaining the environmental optimization parameter of the target environment based on the acoustic characteristic data comprises:

establishing an acoustic transfer model of the target environment based on the acoustic characteristic data, performing iterative adjustments on the audio parameter of the audio system, and obtaining, based on a comparison result between an audio effect corresponding to each of iteratively adjusted audio parameters and the target audio effect, the environmental optimization parameter of the target environment.

4. The audio parameter adjustment method according to claim 3, wherein establishing the acoustic transfer model of the target environment based on the acoustic characteristic data comprises:

obtaining audio data of full-spectrum audio signals for audio testing and extracting the test data of each arrangement position from the acoustic characteristic data; and performing, based on the audio data and the test data, machine learning to establish the acoustic transfer model of the target environment.

5. The audio parameter adjustment method according to claim 3, wherein performing iterative adjustments on the audio parameter of the audio system, and obtaining, based on the comparison result between the audio effect corresponding to each of iteratively adjusted audio parameters and the target audio effect, the environmental optimization parameter of the target environment comprises:

performing iterative adjustments on the audio parameter of the audio system based on an optimization algorithm, and performing audio tests based on the iteratively adjusted audio parameters and the acoustic transfer model to obtain audio effects corresponding to the audio parameters respectively; and selecting an audio effect that matches the target audio effect from the audio effects to obtain an effective audio effect, and obtaining the environmental optimization parameter of the target environment based on an audio parameter corresponding to the effective audio effect.

6. The audio parameter adjustment method according to claim 1, wherein generating the adjustment control instructions based on the optimization parameter, and sending the adjustment control instructions to perform equalizer setting on the audio system and adjust the audio parameter of the audio system comprises:

obtaining an interface format of the audio system and performing format conversion on the optimization parameter based on the interface format, and generating the adjustment control command of the audio system; and sending the adjustment control instructions to the equalizer of the audio system and perform equalizer setting on the audio system by adjusting a value of the equalizer to adjust the audio parameter of the audio system.

7. An audio parameter adjustment device, comprising a memory and at least one processor, wherein instructions are stored in the memory; the at least one processor calls the instructions in the memory to cause the audio parameter adjustment device to implement steps of the audio parameter adjustment method according to claim 1.

8. A non-transitory computer-readable storage medium having stored thereon instructions, wherein when the instructions are executed by a processor, steps of the audio parameter adjustment method according to claim 1 are implemented.

9. An audio parameter adjustment apparatus, comprising:

an analyzing module, configured to obtain a target audio effect of an audio system, and analyze the target audio effect to obtain a corresponding audio metric parameter;

a first calculating module, configured to determine a target environment where the audio system is currently located, and calculate an environmental optimization parameter of the target environment;

a second calculating module, configured to calculate, based on the audio metric parameter and the environmental optimization parameter, an optimization parameter of the audio system; and an adjustment module, configured to perform adaptive adjustment on the audio system based on the optimization parameter of the audio system;

wherein the analyzing module is further configured to:

obtain performance metrics from a system setting of the audio system, determine the target audio effect of the audio system based on the performance metrics, input a sample of the target audio effect into a selected audio editing and analysis software, and perform audio effect analysis to obtain a spectrum distribution of the target audio effect, wherein the spectrum distribution comprises a spectrum diagram and a waveform diagram; and perform analysis based on the spectrum diagram and the waveform diagram;

wherein performing analysis based on the spectrum diagram and the waveform diagram comprises:

identifying the enhancement or attenuation of a specific frequency band, and a harmonic structure of the specific frequency band through the spectrum diagram;

analyzing an amplitude, a period, and a phase of a signal through the waveform diagram; and identifying a dynamic change, transient response, and distortion or noise in the signal through the waveform diagram;

wherein the analyzing module is further configured to:

determine properties of the target audio effect based on an analysis result, wherein the properties comprise a frequency response characteristic, a dynamic processing characteristic, a stereo processing characteristic, distortion and noise; and perform splitting and metric parameter mapping based on the properties of the target audio effect to obtain the audio metric parameter;

wherein performing splitting and metric parameter mapping comprises:

mapping the frequency response characteristic to an enhanced or attenuated frequency band;

mapping the dynamic processing characteristic to a compression ratio, release time, and attack time;

mapping the stereo processing characteristic to a stereo width, a reverb depth and echo time; and mapping distortion and noise characteristic to harmonic distortion, intermodulation distortion and background noise level;

wherein the first calculating module comprises:

a sampling unit, configured to determine spatial layout of the target environment where the audio system is currently located; and perform, based on the spatial layout, acoustic characteristic data sampling on the target environment to obtain the environmental optimization parameter of the target environment;

wherein the sampling unit is further configured to:

obtain the spatial layout of the target environment and determining arrangement positions of audio testing devices based on the spatial layout;

perform audio tests on the target environment using full-spectrum audio signals and obtain test data of each arrangement position to obtain the acoustic characteristic data of the target environment; and obtain the environmental optimization parameter of the target environment based on the acoustic characteristic data;

wherein the second calculating module comprises:

a splitting unit, configured to perform numerical splitting on the environmental optimization parameter to identify an optimization parameter item and a corresponding optimization parameter value; and a value determining unit, configured to optimize, based on the optimization parameter item and the corresponding optimization parameter value, the audio metric parameter to calculate the optimization parameter of the audio system;

wherein the adjustment module comprises:

a sending unit, configured to generate adjustment control instructions based on the optimization parameter, and send the adjustment control instructions to the audio system to perform equalizer setting on the audio system and adjust an audio parameter of the audio system;

wherein the adjustment module further comprises:

a correspondence unit, configured to generate a correspondence between a preset acoustic transfer model and the audio metric parameter, and create a model audio configuration database.

* * * * *